US009852791B1

(12) United States Patent
Tseng et al.

(10) Patent No.: US 9,852,791 B1
(45) Date of Patent: Dec. 26, 2017

(54) SEMICONDUCTOR MEMORY DEVICE, CHIP ID GENERATION METHOD THEREOF AND MANUFACTURING METHOD THEREOF

(71) Applicant: MACRONIX INTERNATIONAL CO., LTD., Hsinchu (TW)

(72) Inventors: Po-Hao Tseng, Taichung (TW); Ming-Hsiu Lee, Hsinchu (TW); Kai-Chieh Hsu, Taoyuan (TW); Yu-Yu Lin, New Taipei (TW); Feng-Min Lee, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 15/487,458

(22) Filed: Apr. 14, 2017

Related U.S. Application Data

(63) Continuation-in-part of application No. 15/391,062, filed on Dec. 27, 2016.
(Continued)

(51) Int. Cl.
*G11C 13/00* (2006.01)
*H01L 45/00* (2006.01)
(Continued)

(52) U.S. Cl.
CPC ...... *G11C 13/0059* (2013.01); *G11C 13/0002* (2013.01); *G11C 13/004* (2013.01);
(Continued)

(58) Field of Classification Search
CPC ............ G11C 13/0069; G11C 13/0004; G11C 13/0007; G11C 11/5678; G11C 13/0002;
(Continued)

(56) References Cited

U.S. PATENT DOCUMENTS 8,687,410 B2 * 4/2014 Herner ................ G11C 11/5685
365/148
8,995,169 B1 * 3/2015 Bandyopadhyay
.......................... G11C 13/0069
365/148

(Continued)

OTHER PUBLICATIONS

TIPO Office Action dated Oct. 6, 2017 in Taiwan application (No. 106111978).

*Primary Examiner* — Vibol Tan
(74) *Attorney, Agent, or Firm* — McClure, Qualey & Rodack, LLP

(57) ABSTRACT

A semiconductor memory device includes programmable resistance memory cells and a controller which applies a forming pulse to first and second groups of the programmable resistance memory cells for inducing a change in the first group from an initial resistance range to an intermediate resistance range, and for inducing the second group having a resistance outside the intermediate range. When a forming rate is lower than a first forming threshold rate, the controller adjusts the forming pulse until the forming rate is higher than the first forming threshold rate. When a forming rate is higher than the first forming threshold rate but lower than a second forming threshold rate, the controller adjusts the forming pulse until the forming rate is higher than the second forming threshold rate. The controller applies a programming pulse to the first and second groups and generates a chip ID of the semiconductor memory device.

15 Claims, 8 Drawing Sheets

Related U.S. Application Data

(60) Provisional application No. 62/461,800, filed on Feb. 22, 2017.

(51) Int. Cl.
  *H01L 21/02* (2006.01)
  *H01L 29/18* (2006.01)

(52) U.S. Cl.
  CPC ...... *G11C 13/0007* (2013.01); *G11C 13/0069* (2013.01); *H01L 21/02* (2013.01); *H01L 29/18* (2013.01); *H01L 45/00* (2013.01); *H01L 45/06* (2013.01); *G11C 2013/0092* (2013.01)

(58) Field of Classification Search
  CPC ........ G11C 2013/0083; G11C 11/5614; G11C 13/003; G11C 2213/78; G11C 11/5628; G11C 16/10; G11C 29/78; G11C 2013/0078; G11C 13/0059; G11C 2013/0092; H01L 45/06; H01L 9/3278; G06F 21/73; G06F 12/14; G06F 21/00; G06F 9/46

See application file for complete search history.

(56) References Cited

U.S. PATENT DOCUMENTS

| | | | |
|---|---|---|---|
| 9,001,554 B2* | 4/2015 | Hashim | H01L 45/08 365/148 |
| 9,171,617 B1 | 10/2015 | Park et al. | |
| 9,336,876 B1* | 5/2016 | Kumar | G11C 13/0069 |
| 2015/0169247 A1 | 6/2015 | Wang et al. | |
| 2016/0148664 A1 | 5/2016 | Katoh et al. | |
| 2016/0148679 A1 | 5/2016 | Yoshimoto et al. | |
| 2016/0148680 A1 | 5/2016 | Yoshimoto et al. | |
| 2016/0156476 A1 | 6/2016 | Lee et al. | |

* cited by examiner

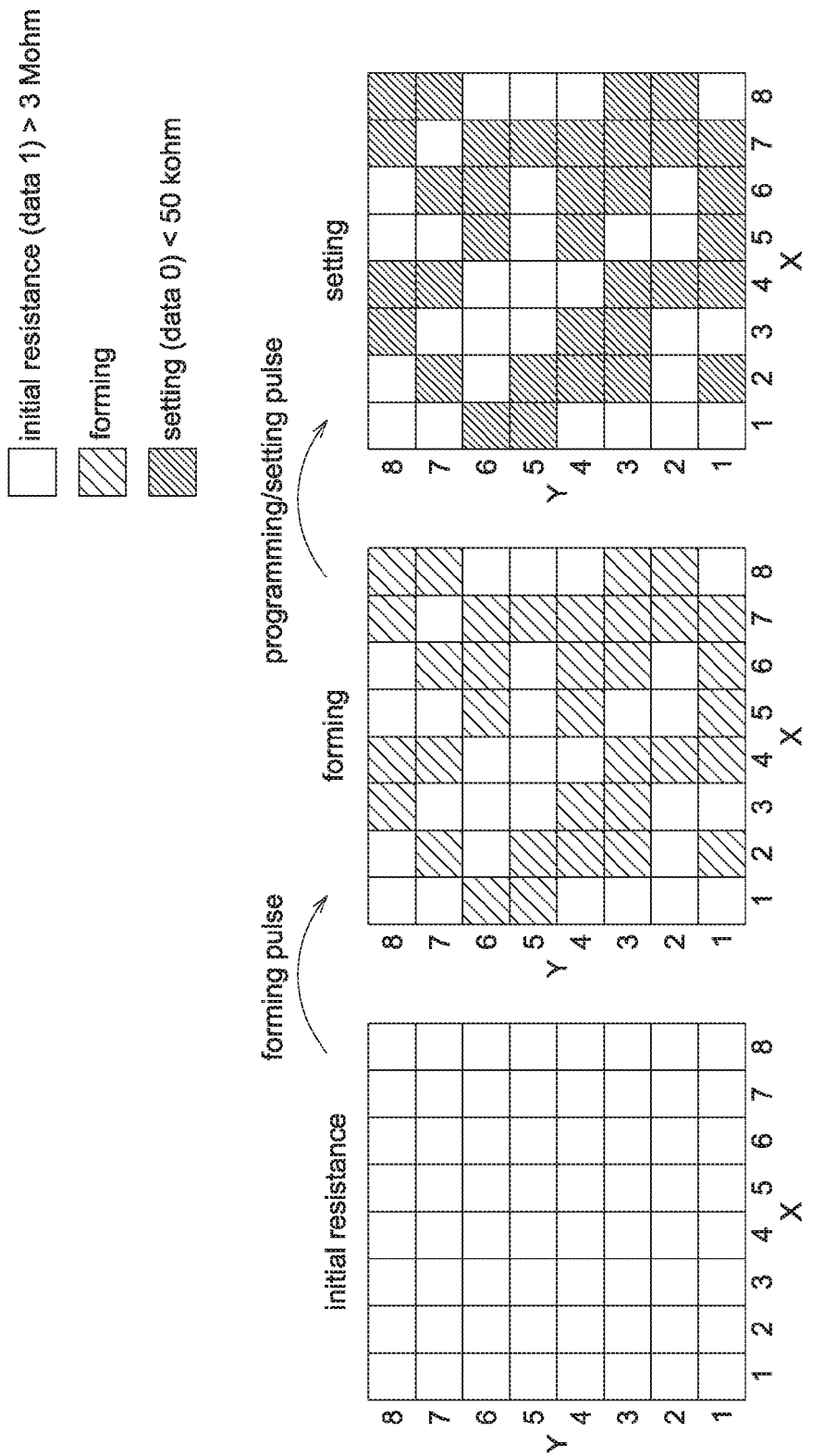

SEMICONDUCTOR MEMORY DEVICE, CHIP ID GENERATION METHOD THEREOF AND MANUFACTURING METHOD THEREOF

CROSS-REFERENCE TO RELATED ART

This application is a continuation-in-part application of co-pending application Ser. No. 15/391,062, filed on Dec. 27, 2016, and claims the benefit of U.S. Patent Provisional application Ser. No. 62/461,800, filed on Feb. 22, 2017, the contents of which are incorporated herein by reference herein in their entirety.

TECHNICAL FIELD

The present invention relates to a semiconductor memory device, a chip ID generation method and a manufacturing method thereof.

BACKGROUND

A physical unclonable function (PUF) is a process usable to create a unique, random key for a physical entity such as an integrated circuit or a semiconductor memory device. Use of a PUF is a solution for generating chip IDs (Identity) supporting a hardware intrinsic security (HIS) technology on a physical entity such as an integrated circuit or a semiconductor memory device wherein each chip is related to its own chip ID. In order to achieve low bit error rate and high uniqueness, PUFs have been used for key creation in applications with high security requirements, such as mobile and embedded devices.

Most PUF may generate chip ID based on threshold voltage differences in the transistors, for example, the SRAM PUF or the floating-gate memory PUF. ReRAM (Resistive random-access memory) PUF has been developed which use resistance difference to generate chip ID. However, in high temperature, most PUF still has high bit error rate.

It is desirable to provide a semiconductor memory device, a chip ID generation method and a manufacturing method therefor, which may improve randomness of PUF and may efficiently decrease bit error rate even in high temperature.

SUMMARY

According to one embodiment, provided is a semiconductor memory device including: a plurality of programmable resistance memory cells; and a controller coupled to the plurality of programmable resistance memory cells. The controller is configured for: applying a forming pulse to a first group and a second group of the plurality of programmable resistance memory cells, for inducing a change in resistance in the first group of the programmable resistance memory cells from an initial resistance range to an intermediate resistance range, while the second group of the programmable resistance memory cells has a resistance outside the intermediate resistance range; determining a forming rate according to the first group of the programmable resistance memory cells; when the forming rate is lower than a first forming threshold rate, adjusting the forming pulse until the forming rate is higher than the first forming threshold rate; when the forming rate is higher than the first forming threshold rate but lower than the second forming threshold rate, adjusting the forming pulse until the forming rate is higher than the second forming threshold rate; applying a programming pulse to the first and second groups of the programmable resistance memory cells, for inducing a change in resistance of the first group from the intermediate resistance range to a first final resistance range, while the second group of the programmable resistance memory cells has a resistance in a second final resistance range that does not overlap the first final resistance range; and generating a chip identity of the semiconductor memory device based on the first and second groups of the programmable memory cells.

According to another embodiment, provided is a chip identity (ID) generation method for a semiconductor memory device including a plurality of programmable resistance memory cells. The chip ID generation method includes: applying a forming pulse to a first group and a second group of the plurality of programmable resistance memory cells, for inducing a change in resistance in the first group of the programmable resistance memory cells from an initial resistance range to an intermediate resistance range, while the second group of the programmable resistance memory cells has a resistance outside the intermediate resistance range; determining a forming rate according to the first group of the programmable resistance memory cells; when the forming rate is lower than a first forming threshold rate, adjusting the forming pulse until the forming rate is higher than the first forming threshold rate; when the forming rate is higher than the first forming threshold rate but lower than the second forming threshold rate, adjusting the forming pulse until the forming rate is higher than the second forming threshold rate; applying a programming pulse to the first and second groups of the programmable resistance memory cells, for inducing a change in resistance of the first group from the intermediate resistance range to a first final resistance range, while the second group of the programmable resistance memory cells has a resistance in a second final resistance range that does not overlap the first final resistance range; and generating the chip ID of the semiconductor memory device based on the first and second groups of the programmable memory cells.

One embodiment of the application discloses a manufacturing method for a semiconductor memory device. The manufacturing method includes: forming a plurality of programmable resistance memory cells on the semiconductor memory device; connecting the semiconductor memory device to a system configured to apply a physical unclonable function to the programmable resistance memory cells of the semiconductor memory device; and using the system to generate a chip identity (ID) from the programmable resistance memory cells. The system is configured for: applying a forming pulse to a first group and a second group of the plurality of programmable resistance memory cells, for inducing a change in resistance in the first group of the programmable resistance memory cells from an initial resistance range to an intermediate resistance range, while the second group of the programmable resistance memory cells has a resistance outside the intermediate resistance range; determining a forming rate according to the first group of the programmable resistance memory cells; when the forming rate is lower than a first forming threshold rate, adjusting the forming pulse until the forming rate is higher than the first forming threshold rate; when the forming rate is higher than the first forming threshold rate but lower than the second forming threshold rate, adjusting the forming pulse until the forming rate is higher than the second forming threshold rate; applying a programming pulse to the first and second groups of the programmable resistance memory cells, for inducing a change in resistance of the first group from the intermediate resistance range to a first final resistance range, while the second group of the programmable resistance memory cells has a resistance in a second final resistance range that does not overlap the first final resistance range; and generating the chip ID of the semiconductor memory device based on the first and second groups of the programmable memory cells.

BRIEF DESCRIPTION OF THE DRAWINGS

FIGS. 7A, 7B and 7C illustrate results of applying forming pulses and programming pulses according to an embodiment of the application.

Figure 1:
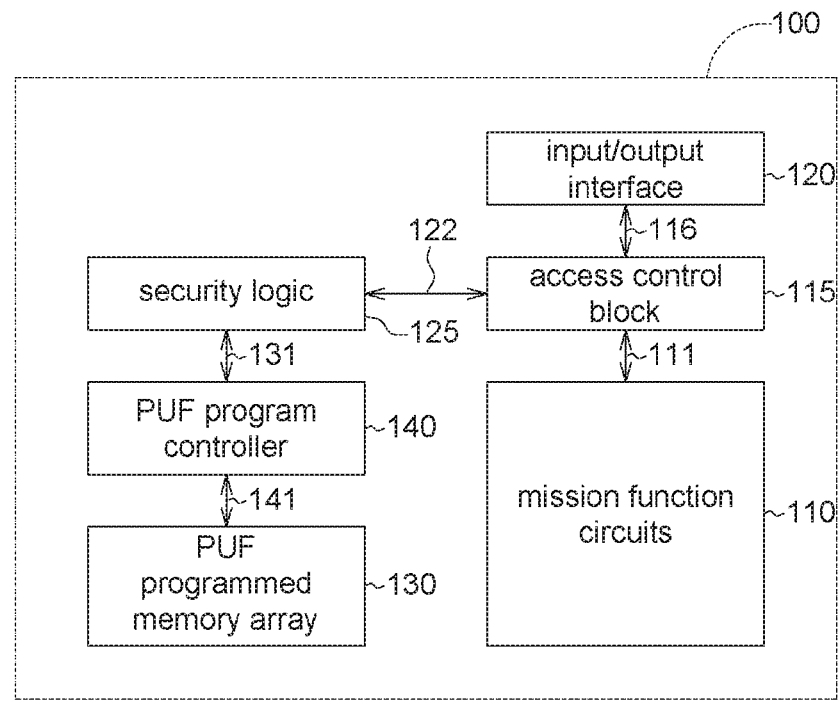
FIG. 1 is a simplified block diagram of a semiconductor memory device according to an embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

A detailed description of embodiments of the present technology is provided with reference to the Figures. It is to be understood that there is no intention to limit the technology to the specifically disclosed structural embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows. Like elements in various embodiments are commonly referred to with like reference numerals.

FIG. 1 is a simplified block diagram of a semiconductor memory device 100 according to an embodiment of the application. The semiconductor memory device 100 includes a memory array including a plurality of programmable resistance memory cells. In the embodiment of the application, PUF programming is used to create and store a data set, which may be used for example as a unique chip ID, a key for an authentication or encryption protocol, or other type of secret or unique data value.

The semiconductor memory device 100 includes a plurality of programmable resistance memory cells and a controller for executing PUF to store data set in the programmable resistance memory cells.

The integrated circuit 100 includes mission function circuits 110, an access control block 115, an input/output interface 120, a security logic 125, a PUF programmed memory array 130 and a PUF program controller 140. The integrated circuit 100 further includes buses 111, 116, 122, 131 and 141.

The mission function circuits 110 may include special purpose logic sometimes referred to as application-specific integrated circuit logic, data processor resources such as used in microprocessors and digital signal processors, large-scale memory such as flash memory, DRAM memory, programmable resistance memory and combinations of various types of circuits known as system on chip configurations.

The input/output interface 120 may comprise wireless or wired ports for acting as an input/output interface between the semiconductor memory device 100 and other devices.

The access control block 115 is disposed between the input/output interface 120 and the mission function circuits 110. The access control block 115 is coupled by the bus 116 to the input/output interface 120, and by the bus 111 to the mission function circuits 110. The access control block 115 may enable or disable communications between the mission function circuits 110 and the input/output interface 120.

In support of the access control block 115, the security logic 125 is disposed on the chip in this example. Security logic 125 is coupled to the PUF programmed memory array 130, which after execution of the PUF stores a unique data set. In needed, the unique data set is accessible from the PUF programmed memory array 130 by the security logic 125 through the PUF program controller 140 and the bus 131, and sent through the bus 122 to the access control block 115.

The PUF programmed memory array 130 includes programmable resistance memory cells each including a programmable element having a programmable resistance. The programmable element may include a metal oxide such as tungsten oxide ($WO_n$), hafnium oxide (HfOx), titanium oxide ($TiO_x$), tantalum oxide ($TaO_x$), titanium nitride oxide (TiNO), nickel oxide ($NiO_x$), ytterbium oxide ($YbO_x$), aluminum oxide ($AlO_x$), niobium oxide ($NbO_x$), zinc oxide ($ZnO_x$), copper oxide ($CuO_x$), vanadium oxide ($VO_x$), molybdenum oxide ($MoO_x$), ruthenium oxide ($RuO_x$), copper silicon oxide ($CuSiO_x$), silver zirconium oxide (AgZrO), aluminum nickel oxide (AlNiO), aluminum titanium oxide (AlTiO), gadolinium oxide ($GdO_x$), gallium oxide ($GaO_x$), zirconium oxide ($ZrO_x$), chromium doped $SrZrO_3$, chromium doped $SrTiO_3$, PCMO, or LaCaMnO, etc. In other possible embodiments, the programmable element of a memory cell may be a semiconductor oxide, such at silicon oxide ($SiO_x$). In one embodiment of the application, the programmable resistance memory cells may be implemented by ReRAM memory cells, but the application is not limited by.

In the embodiment of the application, the PUF program controller 140 may be implemented for example as a state machine. The PUF program controller 140 may control the application of bias arrangement supply voltages to carry out the PUF procedure, or for accessing the PUF programmed memory array 130 for the PUF, or for reading data set stored in the PUF programmed memory array 130. The PUF program controller 140 may be implemented using special-purpose logic circuitry as known in the art. In alternative embodiments, the PUF program controller 140 may include a general-purpose processor which executes a computer program to control the operations of the semiconductor memory device 100. In yet other embodiments, a combination of special-purpose logic circuitry and a general-purpose processor may be utilized for implementation of the PUF program controller 140.

The PUF program controller 140 is configured to apply a forming pulse to all or some of the programmable resistance memory cells in the PUF programmed memory array 130. The forming pulse has a forming pulse level. In one embodiment of the application, after the forming pulse is applied, the forming pulse induces a change in resistance in a first group of the programmable resistance memory cells of the PUF programmed memory array 130 from an initial resistance range to an intermediate resistance range and after the forming pulse is applied, a second group of the programmable resistance memory cells has a resistance outside the intermediate range.

The PUF program controller 140 is configured to apply a programming pulse to the first and second groups of the programmable resistance memory cells. The programming pulse has a programming pulse level characterized by inducing a change in resistance of the first group from the intermediate range to a first final resistance range. After the programming pulse, the cells in the second group of the programmable resistance memory cells may remain in a resistance range close to the initial resistance range, or otherwise the cells in the second group of the programmable resistance memory cells may have a resistance in a second final resistance range that does not overlap the first final resistance range. The programming pulse may result in increasing a sensing margin between the cells in the first group and the cells in the second group.

The PUF program controller 140 may adjust the forming pulse to improve the PUF randomness of the programmable resistance memory cells and to improve the security of the chip ID.

The PUF program controller 140 may be configured to sense all or some of the memory cells in the programmed memory array 130 via the security circuit (e.g. 125, FIG. 1) using a read voltage. The first and second ranges are separated by a read margin, which is greater than a margin between the initial resistance range and the intermediate range.

Figure 2:
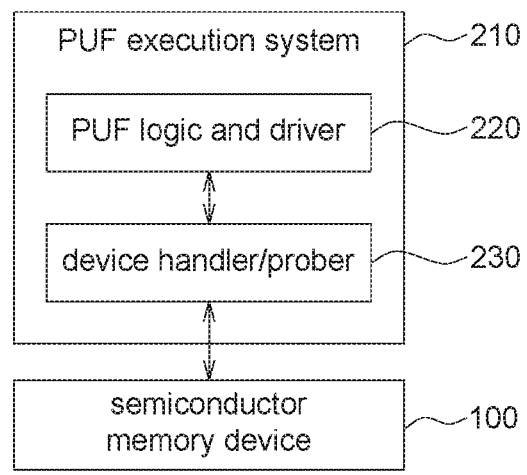
FIG. 2 shows an example system used for executing PUF on the semiconductor memory device according to an embodiment of the application.

FIG. 2 shows an example system used for executing PUF on the semiconductor memory device according to an embodiment of the application. As shown in FIG. 2, a PUF execution system 210 is coupled to the semiconductor memory device 100. The PUF execution system 210 is used for controlling execution of a physical unclonable function on the semiconductor memory device 100. For instance, the PUF execution system 210 may exercise a PUF program controller (e.g. 140, FIG. 1) on the semiconductor memory device 100 to perform operations in applying the forming pulse, in applying the programming pulse, and in finding the forming pulse level. For instance, the PUF execution system 210 may communicate a forming pulse level to the PUF execution system 210, and the forming pulse level may be used in applying the forming pulse. In another embodiment, the PUF program controller 140 on the semiconductor memory device 100 includes all the logic (circuits) necessary to apply the forming pulse and the programming pulse, and to find the forming pulse level.

The PUF execution system for executing a physical unclonable function on the semiconductor memory device 100 may include multiple device testers, multiple device probers, multiple device handlers, and multiple interface test adapters. A device tester may interact with a device prober to test integrated circuit die in wafer form. A device tester may also interact with a device handler to test packaged integrated circuits. As shown in FIG. 2, the PUF execution system 210 includes PUF logic and driver 220, and a device handler/prober 230. A device (for example, the semiconductor memory device 100 of FIG. 1) to be subjected to the PUF logic and driver 220 is coupled to the device handler/prober 230.

The programmable resistance memory cells may include programmable resistance memory elements. In one embodiment, the programmable resistance memory elements may be characterized by an initial resistance in a high resistance range, where the intermediate resistance range is lower than the high resistance range, the first final resistance range is lower than the intermediate resistance range, and the second final resistance range is higher than the first final resistance range.

In another embodiment, the programmable resistance memory elements may be characterized by an initial resistance in a low resistance range, where the intermediate resistance range is higher than the low resistance range, the first final resistance range is higher than the intermediate resistance range, and the second final resistance range is lower than the first final resistance range.

In the embodiment of the application, after the forming pulse is applied to all or some of the programmable resistance memory cells of the PUF programmed memory array 130 of the semiconductor memory device 100, the forming pulse induces a change in resistance in a first group of the programmable resistance memory cells from an initial resistance range to an intermediate resistance range, while a second group of the programmable resistance memory cells has a resistance outside the intermediate range. For instance, for a WOx (tungsten oxide) based programmable resistance memory that has initial resistance in a high resistance range, an initial resistance range may be between about 2700 KOhm and 3000 KOhm, an intermediate resistance range may be in a range between about 100 KOhm and 400 KOhm.

After a programming pulse is applied to the first and second groups of the programmable resistance memory cells, a read margin between memory cells in the first and second groups is increased. The programming pulse has a programming pulse level characterized by inducing a change in resistance of the first group from the intermediate range to a first final resistance range; and after the programming pulse, the memory cells in the second group of the programmable resistance memory cells may remain in a resistance range much greater than the first final resistance range, such as close to the initial resistance range (which is much greater than the first final resistance range). Or, after the programming pulse is applied, the second group of the programmable resistance memory cells may have a resistance in a second final resistance range that does not overlap the first final resistance range, wherein the second final resistance range is much greater than the first final resistance range. By applying the programming pulse, the sense margin between the memory cells of the first group and the memory cells of the second group is increased.

Figure 3:
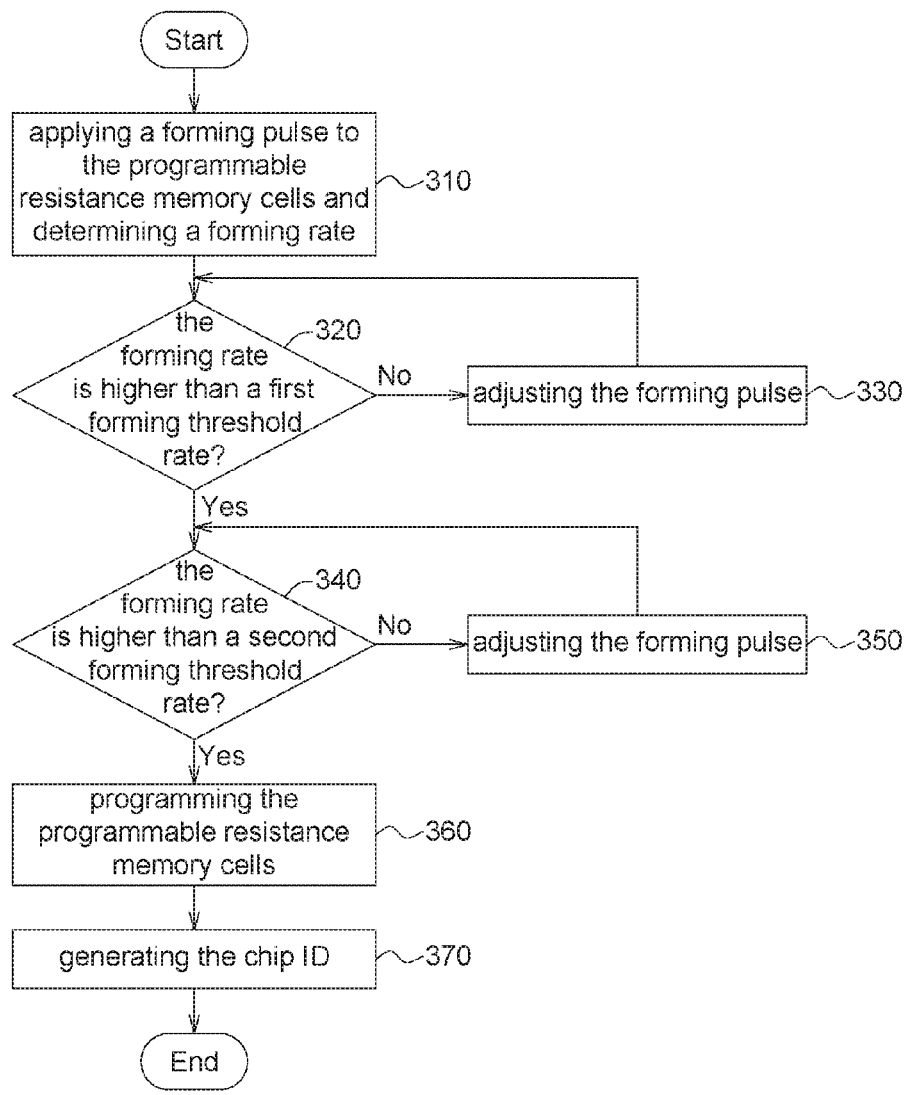
FIG. 3 shows an example flowchart for generating chip ID according to an embodiment of the application.

FIG. 3 shows an example flowchart for generating chip ID according to an embodiment of the application. At Step 310, a forming pulse is applied to all or a part of the programmable resistance memory cells and a forming rate of the programmable resistance memory cells is determined. The forming rate is defined as a ratio of "the number of the programmable resistance memory cells which are successfully formed (i.e. a number of the first group)" and "the number of the programmable resistance memory cells (i.e. a total number of the first group and the second group)". For example but not limited by, "the programmable resistance memory cells which are successfully formed" refer to the programmable resistance memory cells whose resistance is changed from an initial resistance range to an intermediate resistance range after the forming pulse is applied. For example, among 64 programmable resistance memory cells which are applied by the forming pulse, there are 16 programmable resistance memory cells whose resistance is changed from an initial resistance range to an intermediate resistance range (i.e. the first group includes 16 programmable resistance memory cells) and there are 64−16=48 programmable resistance memory cells having a resistance outside the intermediate range (i.e. the second group includes 48 programmable resistance memory cells). The forming rate is 16/64=25%. In other words, the forming rate is a ratio of a number of the first group and a total number of the first group and the second group.

At step 320, it is determined whether the forming rate is higher than a first forming threshold rate (for example but not limited by, the first forming threshold rate being between 35%-45%). If not in step 320, then the flow proceeds to step 330 for adjusting the forming pulse. The details of adjusting the forming pulse in step 330 in the embodiment of the application will be described later. The step 330 may be repeatedly performed until the forming rate is higher than the first forming threshold rate.

When the forming rate is higher than the first forming threshold rate, the flow proceeds to the step 340 to determine whether the forming rate is higher than a second forming threshold rate (for example but not limited by, the second forming threshold rate being between 48%-52%).

If not in step 340, then the flow proceeds to step 350 for adjusting the forming pulse. The details of adjusting the forming pulse in step 350 in the embodiment of the application will be described later. The step 350 may be repeatedly performed until the forming rate is higher than the second forming threshold rate.

Steps 310, 320, 330, 340 and 350 may be performed by the PUF program controller 140 of the semiconductor memory device 100 of FIG. 1.

When the forming rate is higher than the second forming threshold rate, at step 360, the programmable resistance memory cells of the PUF programmed memory array 130 of the semiconductor memory device 100 are performed by a programming operation. In the programming operation, the programmable resistance memory cells (i.e. the first group) which are successfully formed may have a resistance changed from the intermediate range to the first final resistance range. In the programming operation, the programmable resistance memory cells (i.e. the second group) which are not successfully formed may have a resistance changed from the initial resistance range to the second final resistance range, or the programmable resistance memory cells (i.e. the second group) which are not successfully formed may have a resistance kept close to the initial resistance range.

At step 370, the chip ID is generated. The details of generating the chip ID will be described later.

Details of steps 330 and 350 are described. In step 330, when the forming rate is lower than the first forming threshold rate, the voltage level of the forming pulse is increased, and/or the pulse width of the forming pulse is increased. That is, the step 330 is a coarse adjustment step.

In step 350, when the forming rate is lower than the second forming threshold rate, the voltage level of the forming pulse is slightly increased (the step of increasing the voltage level of the forming pulse in step 350 is smaller than the step of increasing the voltage level of the forming pulse in step 330), and/or the pulse width of the forming pulse is increased (the step of increasing the pulse width of the forming pulse in step 350 is smaller than the step of increasing the pulse width of the forming pulse in step 330), and/or the voltage level of the forming pulse is kept, and/or the pulse width of the forming pulse is kept. That is, the step 350 is a fine adjustment step.

Figure 4:
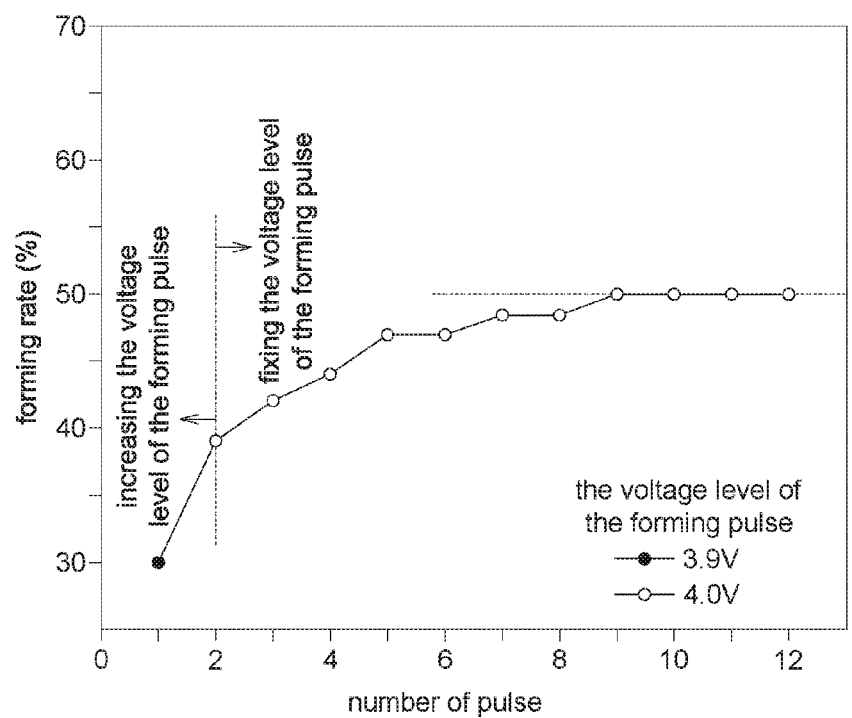
FIG. 4 shows the forming rate, the voltage level of the forming pulse and the pulse number of the forming pulse according to an embodiment of the application.

FIG. 4 shows the forming rate, the voltage level of the forming pulse and the pulse number of the forming pulse according to an embodiment of the application. The word line voltage is for example 4V and the pulse width of the forming pulse is for example 3 μs, which are not used to limit the application. As shown in FIG. 4, when the forming rate is lower than the first forming threshold rate (for example 38% but the application is not limited by), the voltage level of the forming pulse is increased (but the pulse number of the forming pulse is kept at 1) until 3.9V. Then, when the voltage level of the forming pulse is increased to 4.0V and accordingly the forming rate reaches the first forming threshold rate, the voltage level of the forming pulse is kept but the pulse number of the forming pulse is increased, until the forming rate reaches or is higher than the second forming threshold rate.

In an embodiment of the application, when the forming rate is lower than the first forming threshold rate, the voltage level of the forming pulse and/or the pulse number of the forming pulse is increased at large step, so that the forming rate may be fast increased until the forming rate is higher than the first forming threshold rate. By so, the operation time is reduced.

When the forming rate is higher than the first forming threshold rate but lower than the second forming threshold rate, the voltage level of the forming pulse and/or the pulse number of the forming pulse is increased at small step, and/or the voltage level of the forming pulse is kept and/or the pulse number of the forming pulse is kept. By so, the forming rate may precisely reach the second forming threshold rate. That is, the forming rate may be substantially close to 50% and the PUF has high or maximum randomness.

Figure 5A:
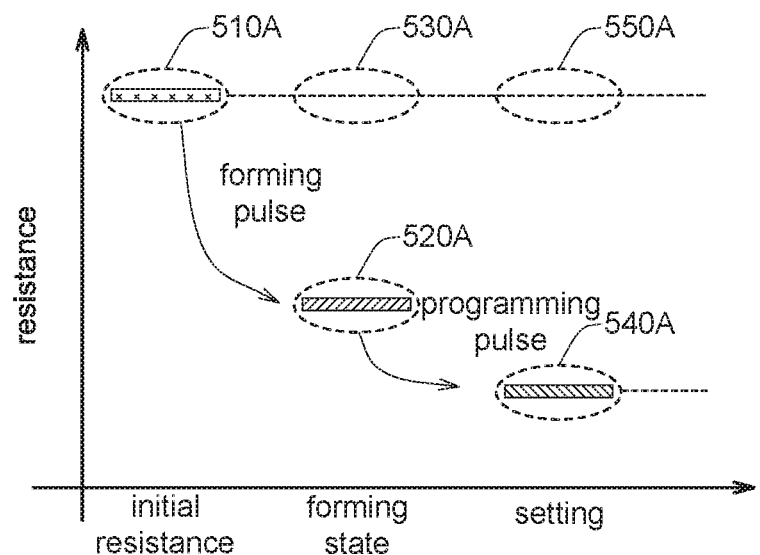
FIGS. 5A and 5B illustrate resistance ranges after applying the forming pulse and the programming pulse according to an embodiment of the application.
Figure 5B:
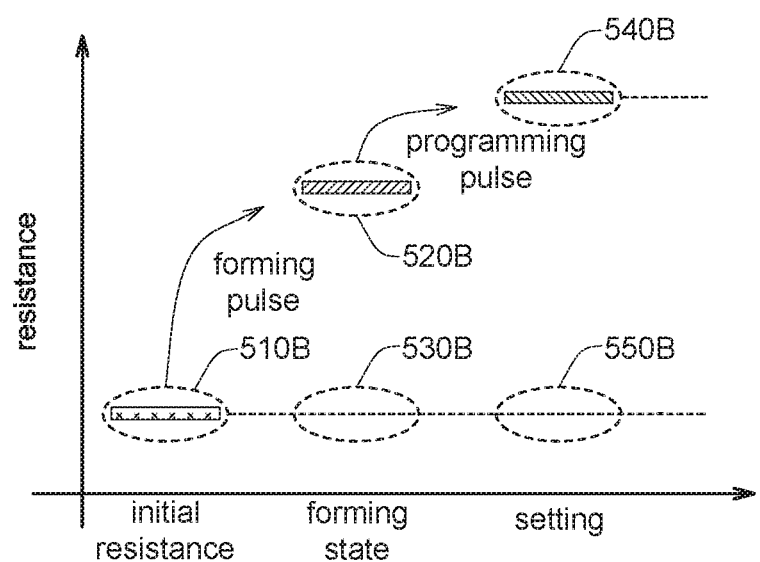

FIGS. 5A and 5B illustrate resistance ranges by applying the forming pulse and the programming pulse according to an embodiment of the application. Before a forming pulse is applied, the programmable resistance memory cells are all in an initial resistance range (e.g. 510A, 510B). After the forming pulse is applied to the programmable resistance memory cells, resistance in a first group of the programmable resistance memory cells is changed to an intermediate resistance range (e.g. 520A, 520B), while a second group of the programmable resistance memory cells has a resistance outside the intermediate range (e.g. 530A, 530B). After the programming pulse is applied, resistance of the first group is changed from the intermediate range to a first final resistance range (e.g. 540A, 540B), while the second group of the programmable resistance memory cells has a resistance in a second final resistance range (e.g. 550A, 550B) that does not overlap the first final resistance range.

In one embodiment as shown in FIG. 5A, the initial resistance range (e.g. 510A) is a high resistance range, the intermediate resistance range (e.g. 520A) is lower than the initial resistance range, the first final resistance range (e.g. 540A) is lower than the intermediate resistance range, and the second final resistance range (e.g. 550A) is higher than the first final resistance range. The programming pulse in this embodiment is referred to as a set pulse. This embodiment is suitable for technologies where memory cells have initial resistance in a high resistance range and are then formed to a lower intermediate range after the forming pulse is applied.

In another embodiment as shown in FIG. 5B, the initial resistance range (e.g. 510B) is a low resistance range, the intermediate resistance range (e.g. 520B) is higher than the initial resistance range, the first final resistance range (e.g. 540B) is higher than the intermediate resistance range, and the second final resistance range (e.g. 550B) is lower than the first final resistance range. The programming pulse in this embodiment is referred to as a reset pulse. This embodiment is suitable for technologies where memory cells have initial resistance in a low resistance range and are then formed to a higher intermediate range after the forming pulse is applied.

Figure 6A:
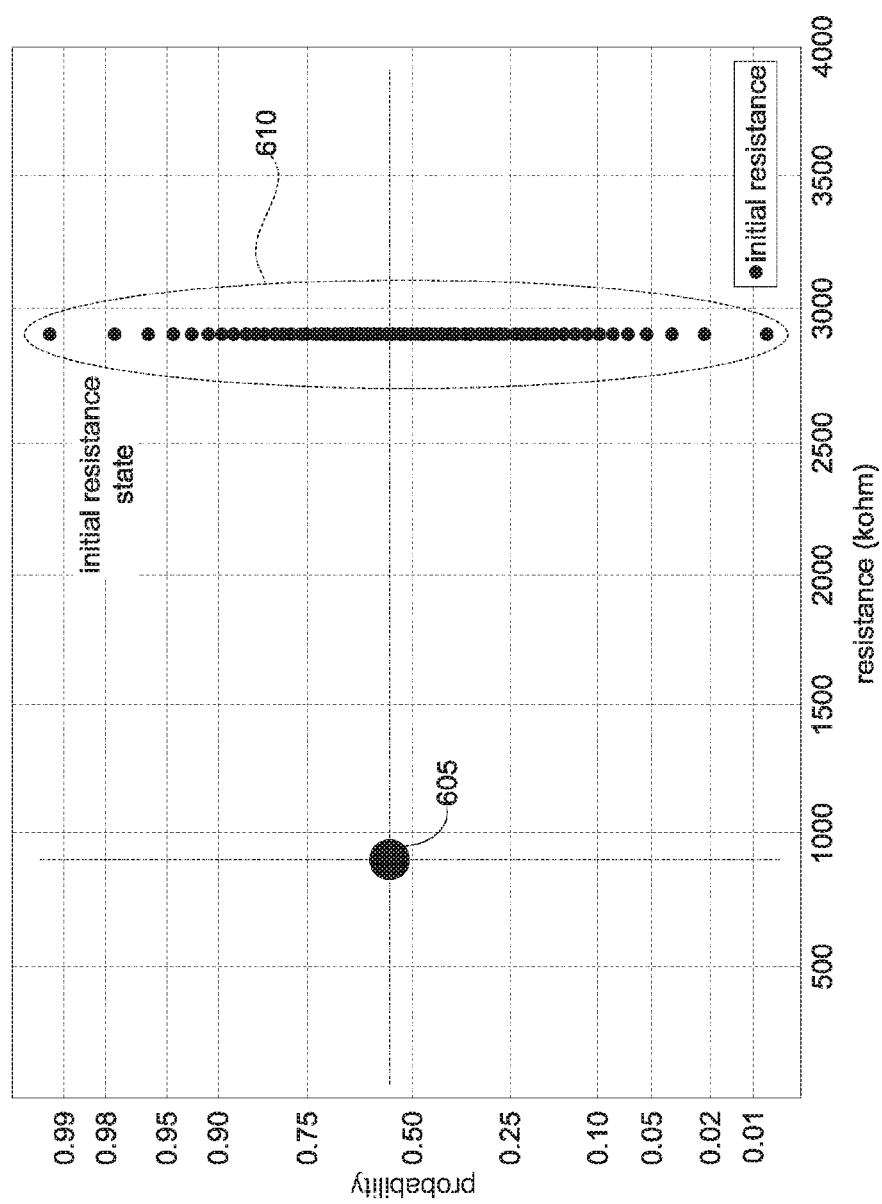
FIGS. 6A, 6B and 6C are probability charts for resistance of memory cells at different stages of a PUF process according to an embodiment of the application.
Figure 6B:
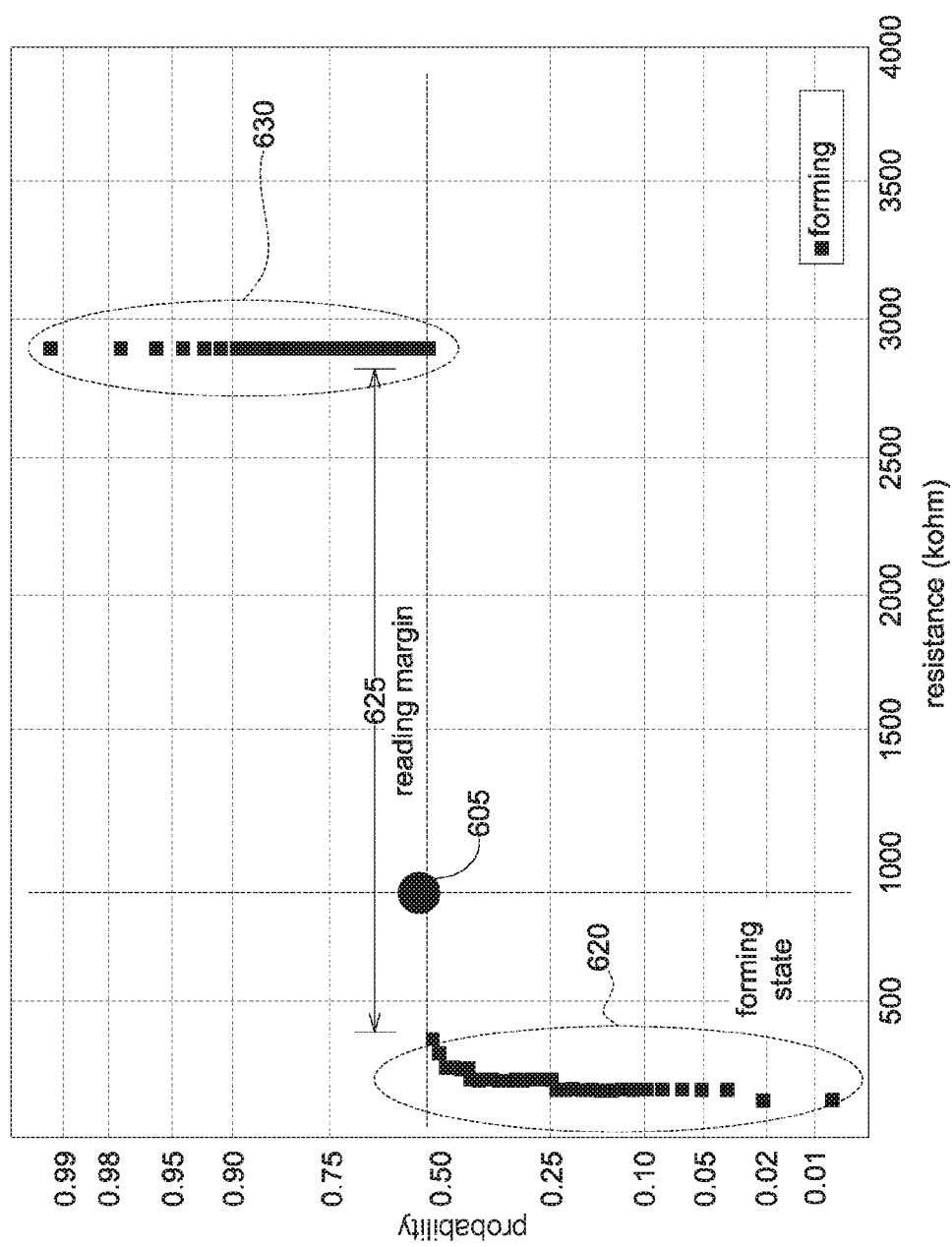
Figure 6C:
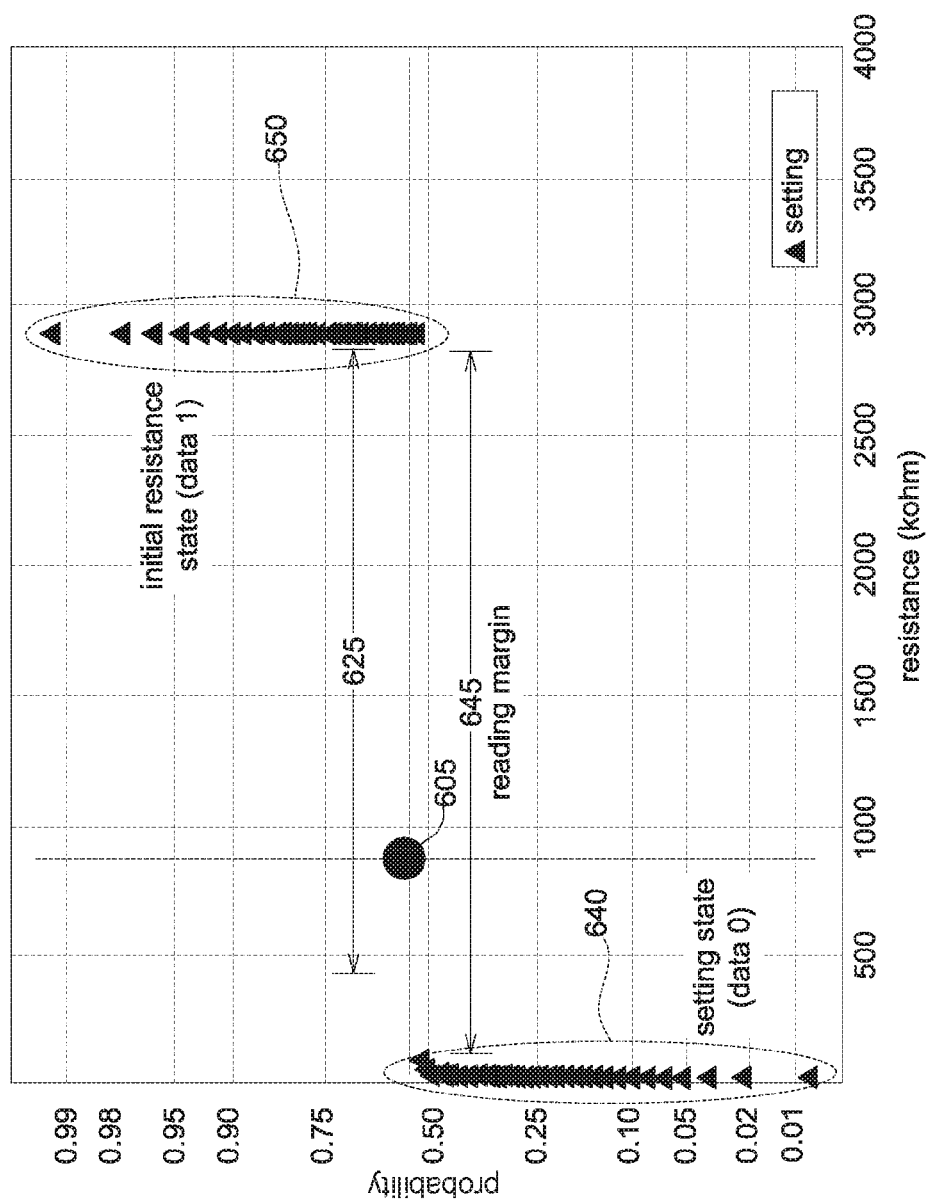

FIGS. 6A, 6B and 6C are probability charts for resistance of memory cells at different stages of a PUF process according to an embodiment of the application. FIG. 6A illustrates that, before a forming pulse is applied, the programmable resistance memory cells are in an initial resistance range 610 for example between about 2700 KOhm and 3000 KOhm, which is higher than the resistance threshold 605.

FIG. 6B illustrates results after applying a forming pulse. Resistance in a first group of the programmable resistance memory cells is changed from an initial resistance range 610 to an intermediate resistance range 620, for example between about 100 KOhm and 400 KOhm. After the forming pulse, a second group of the programmable resistance memory cells has a resistance (for example, range 630) outside the intermediate range. The initial and intermediate resistance ranges are separated by a read margin 625.

FIG. 6C illustrates results after applying a programming pulse. After the programming pulse is applied, resistance of the first group is changed from the intermediate range to a first final resistance range 640, for example between about 0 KOhm and 100 KOhm. The programming pulse can result in increasing a sensing margin between the cells in the first group and the cells in the second group. After the programming pulse, the cells in the second group of programmable resistance memory cells can remain in a resistance range close to the initial resistance range, or otherwise have a resistance in a second final resistance range 650 that does not overlap the first final resistance range. The first and second final resistance ranges 640 and 650 are separated by a read margin 645, which is greater than a margin 625 between the initial resistance range and the intermediate resistance ranges as shown in FIG. 6B. Such a read margin 645 can be wide enough to ensure reliability of the first and second groups of the programmable resistance memory cells.

FIGS. 7A, 7B and 7C illustrate results of applying forming pulses and programming pulses according to an embodiment of the application. In the example of FIG. 7A, memory cells are in an initial resistance range of greater 3 MOhm. In the example of FIG. 7B, after a forming pulse is applied, a first group is changed to an intermediate resistance range or in the form state. In the example of FIG. 7C, after a programming/set pulse is applied, the first group is changed from the intermediate resistance range to a first final resistance range of less than 50 Kohm.

As shown in FIG. 7C, when 64 programmable resistance memory cells are programmed, the chip ID may be obtained in an embodiment of the application. When the chip ID is in binary bit, the chip ID may be expressed as 64bits Cxy= [C11, C12 . . . , C18, C21, . . . C28, . . . C31, . . . C38, . . . C88]=[11110011 . . . 01100011], x and y referring to the X coordinate and Y coordinates of the cell Cxy in FIG. 7A-7C (x=1-8, y=1-8). Of course, the application is not limited by this. In other possible embodiment of the application, the binary chip ID may be encoded into hexadecimal bits. For example, as the example in FIG. 7C, the binary chip ID may be encoded into hexadecimal chip ID "F345CE1C6B49029C" and the application is not limited by this. In other possible embodiments of the application, the chip ID may be obtained by different encoding.

The present technology may be implemented in semiconductor memory devices where memory cells have initial resistance in a high resistance range and are then formed to a lower intermediate range, including transition-metal-oxide devices ($WO_x$ based programmable resistance memories, $Ta_2O_5$ based programmable resistance memories, $HfO_2$ based programmable resistance memories, TiON based programmable resistance memories, $TiO_x$ based programmable resistance memories).

The present technology can be implemented in semiconductor memory devices where memory cells have initial resistance in a low resistance range and are then formed to a higher intermediate range, including initial low resistance metal oxide memories such as WOx programmable resistance memories.

Further, one embodiment of the application discloses a manufacturing method for a semiconductor memory device. The manufacturing method includes: forming a plurality of programmable resistance memory cells on the semiconductor memory device; connecting the semiconductor memory device to a system configured to apply a physical unclonable function to the programmable resistance memory cells of the semiconductor memory device; and using the system to generate a chip identity (ID) from the programmable resistance memory cells. The system is configured for: applying a forming pulse to a first group and a second group of the plurality of programmable resistance memory cells, for inducing a change in resistance in the first group of the programmable resistance memory cells from an initial resistance range to an intermediate resistance range, while the second group of the programmable resistance memory cells has a resistance outside the intermediate resistance range; determining a forming rate according to the first group of the programmable resistance memory cells; when the forming rate is lower than a first forming threshold rate, adjusting the forming pulse until the forming rate is higher than the first forming threshold rate; when the forming rate is higher than the first forming threshold rate but lower than the second forming threshold rate, adjusting the forming pulse until the forming rate is higher than the second forming threshold rate; applying a programming pulse to the first and second groups of the programmable resistance memory cells, for inducing a change in resistance of the first group from the intermediate resistance range to a first final resistance range, while the second group of the programmable resistance memory cells has a resistance in a second final resistance range that does not overlap the first final resistance range; and generating the chip ID of the semiconductor memory device based on the first and second groups of the programmable memory cells.

The embodiments of the application have advantages on that the PUF may have high or even maximum and thus the security of the chip ID of the semiconductor memory device is improved.

While the present technology is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the technology and the scope of the following claims.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A semiconductor memory device, including:
a plurality of programmable resistance memory cells; and
a controller coupled to the plurality of programmable resistance memory cells, the controller being configured for:
applying a forming pulse to a first group and a second group of the plurality of programmable resistance memory cells, for inducing a change in resistance in the first group of the programmable resistance memory cells from an initial resistance range to an intermediate resistance range, while the second group of the programmable resistance memory cells has a resistance outside the intermediate resistance range;
determining a forming rate according to the first group of the programmable resistance memory cells;
when the forming rate is lower than a first forming threshold rate, adjusting the forming pulse until the forming rate is higher than the first forming threshold rate;
when the forming rate is higher than the first forming threshold rate but lower than the second forming threshold rate, adjusting the forming pulse until the forming rate is higher than the second forming threshold rate;
applying a programming pulse to the first and second groups of the programmable resistance memory cells, for inducing a change in resistance of the first group from the intermediate resistance range to a first final resistance range, while the second group of the programmable resistance memory cells has a resistance in a second final resistance range that does not overlap the first final resistance range; and
generating a chip identity of the semiconductor memory device based on the first and second groups of the programmable memory cells.

2. The semiconductor memory device of claim 1, wherein the first and second final resistance ranges are separated by a read margin which is greater than a margin between the initial resistance range and the intermediate resistance range.

3. The semiconductor memory device of claim 1, wherein the programmable resistance memory cells comprise programmable resistance memory elements characterized by that an initial resistance of the programmable resistance memory elements is higher than the intermediate resistance range, the first final resistance range is lower than the intermediate resistance range, and the second final resistance range is higher than the first final resistance range.

4. The semiconductor memory device of claim 1, wherein the programmable resistance memory cells comprise programmable resistance memory elements characterized by that an initial resistance of the programmable resistance memory elements is lower than the intermediate resistance range, the first final resistance range is higher than the intermediate resistance range, and the second final resistance range is lower than the first final resistance range.

5. The semiconductor memory device of claim 1, wherein the forming rate is a ratio of a number of the first group and a total number of the first group and the second group.

6. The semiconductor memory device of claim 1, wherein the forming rate is lower than the first forming threshold rate, the controller increases a voltage level of the forming pulse and/or increases a pulse width of the forming pulse.

7. The semiconductor memory device of claim 1, wherein the forming rate is higher than the first forming threshold rate but lower than the second forming threshold rate, the controller increases a voltage level of the forming pulse and/or increases a pulse width of the forming pulse and/or keeps the voltage level of the forming pulse and/or keeps the pulse width of the forming pulse.

8. A chip identity (ID) generation method for a semiconductor memory device including a plurality of programmable resistance memory cells, the chip ID generation method including:
applying a forming pulse to a first group and a second group of the plurality of programmable resistance memory cells, for inducing a change in resistance in the first group of the programmable resistance memory cells from an initial resistance range to an intermediate resistance range, while the second group of the programmable resistance memory cells has a resistance outside the intermediate resistance range;
determining a forming rate according to the first group of the programmable resistance memory cells;
when the forming rate is lower than a first forming threshold rate, adjusting the forming pulse until the forming rate is higher than the first forming threshold rate;
when the forming rate is higher than the first forming threshold rate but lower than the second forming threshold rate, adjusting the forming pulse until the forming rate is higher than the second forming threshold rate;
applying a programming pulse to the first and second groups of the programmable resistance memory cells, for inducing a change in resistance of the first group from the intermediate resistance range to a first final resistance range, while the second group of the programmable resistance memory cells has a resistance in a second final resistance range that does not overlap the first final resistance range; and
generating the chip ID of the semiconductor memory device based on the first and second groups of the programmable memory cells.

9. The chip ID generation method of claim 8, wherein the first and second final resistance ranges are separated by a read margin which is greater than a margin between the initial resistance range and the intermediate resistance range.

10. The chip ID generation method of claim 8, wherein the programmable resistance memory cells comprise programmable resistance memory elements characterized by that an initial resistance of the programmable resistance memory elements is higher than the intermediate resistance range, the first final resistance range is lower than the intermediate resistance range, and the second final resistance range is higher than the first final resistance range.

11. The chip ID generation method of claim 8, wherein the programmable resistance memory cells comprise programmable resistance memory elements characterized by that an initial resistance of the programmable resistance memory elements is lower than the intermediate resistance range, the first final resistance range is higher than the intermediate resistance range, and the second final resistance range is lower than the first final resistance range.

12. The chip ID generation method of claim 8, wherein the forming rate is a ratio of a number of the first group and a total number of the first group and the second group.

13. The chip ID generation method of claim 8, wherein the forming rate is lower than the first forming threshold rate, the controller increases a voltage level of the forming pulse and/or increases a pulse width of the forming pulse.

14. The chip ID generation method of claim 8, wherein the forming rate is higher than the first forming threshold rate but lower than the second forming threshold rate, the controller increases a voltage level of the forming pulse and/or increases a pulse width of the forming pulse and/or keeps the voltage level of the forming pulse and/or keeps the pulse width of the forming pulse.

15. A manufacturing method for a semiconductor memory device, the manufacturing method including:
   forming a plurality of programmable resistance memory cells on the semiconductor memory device;
   connecting the semiconductor memory device to a system configured to apply a physical unclonable function to the programmable resistance memory cells of the semiconductor memory device; and
   using the system to generate a chip identity (ID) from the programmable resistance memory cells by:
      applying a forming pulse to a first group and a second group of the plurality of programmable resistance memory cells, for inducing a change in resistance in the first group of the programmable resistance memory cells from an initial resistance range to an intermediate resistance range, while the second group of the programmable resistance memory cells has a resistance outside the intermediate resistance range;
      determining a forming rate according to the first group of the programmable resistance memory cells;
      when the forming rate is lower than a first forming threshold rate, adjusting the forming pulse until the forming rate is higher than the first forming threshold rate;
      when the forming rate is higher than the first forming threshold rate but lower than the second forming threshold rate, adjusting the forming pulse until the forming rate is higher than the second forming threshold rate;
      applying a programming pulse to the first and second groups of the programmable resistance memory cells, for inducing a change in resistance of the first group from the intermediate resistance range to a first final resistance range, while the second group of the programmable resistance memory cells has a resistance in a second final resistance range that does not overlap the first final resistance range; and
      generating the chip ID of the semiconductor memory device based on the first and second groups of the programmable memory cells.

* * * * *